United States Patent [19]

Hyppänen

[11] Patent Number: 5,533,471

[45] Date of Patent: Jul. 9, 1996

[54] FLUIDIZED BED REACTOR AND METHOD OF OPERATION THEREOF

[75] Inventor: Timo Hyppänen, Karhula, Finland

[73] Assignee: A. Ahlstrom Corporation, Noormarkku, Finland

[21] Appl. No.: 291,461

[22] Filed: Aug. 17, 1994

[51] Int. Cl.$^6$ .................................................. F22B 1/02
[52] U.S. Cl. ............................................ 122/4 D; 110/245
[58] Field of Search ............................ 122/4 D; 110/245

[56] References Cited

U.S. PATENT DOCUMENTS

| | | | |
|---|---|---|---|
| 3,893,426 | 7/1975 | Bryers | 122/4 D |
| 4,111,158 | 9/1978 | Reh et al. | 122/4 D |
| 4,829,912 | 5/1989 | Alliston | 122/4 D |
| 4,947,804 | 8/1990 | Abdulally | 122/4 D |
| 4,969,404 | 11/1990 | Virr | 110/245 |
| 5,141,708 | 8/1992 | Campbell et al. | 110/245 |
| 5,332,553 | 7/1994 | Hyppanen | 110/245 |

*Primary Examiner*—Noah P. Kamen
*Attorney, Agent, or Firm*—Nixon & Vanderhye

[57] ABSTRACT

A fluidized bed reactor system includes a reaction chamber comprising a circulating (fast) fluidized bed, with a first grid for the introduction of fluidizing gas, and a bubbling (slow) fluidized bed having a second grid for introduction of fluidizing gas. The second grid is mounted below the first grid. First and second interconnections are provided between the circulating and bubbling beds. Particles flow from the circulating bed through the first interconnection to the bubbling bed, and vice versa for the second connection. The interconnections are positioned with respect to each other so that the pressure and density conditions within the beds are the sole mechanisms that provide the driving force to control the flow of particles from the circulating bed to the bubbling bed. An indirect heat exchanger is located in the bubbling bed for cooling particles, and various constructions of partitions may be provided for dividing up the bubbling bed and defining the interconnections, the system and method provided being greatly simplified compared to prior art constructions.

24 Claims, 5 Drawing Sheets

FLUIDIZED BED REACTOR AND METHOD OF OPERATION THEREOF

BACKGROUND AND SUMMARY OF THE INVENTION

The present invention relates to a fluidized bed reactor and method of operating the fluidized bed reactor. More specifically the invention relates to controlled operation of a circulating fluidized bed reactor that has a number of advantages compared to prior art constructions and processes. The invention is greatly simplified compared to the prior art yet allows precise control of the temperature of the reactor in an efficient manner, increases heat transfer capacity at different loads, and is otherwise advantageous.

Circulating fluidized beds are well known, such as shown in U.S. Pat. No. 4,111,158. In circulating fluidized bed reactors fuel is reacted in a fluidized bed of solid (inert, and/or active—such as limestone) particles. The gas velocities and rate of gas feeds are controlled to such a manner that substantial portion of the solid particles are entrained with the gas flowing in the fluidized bed reactor from a lower part to an upper part. It is characteristic for operation of circulating fluidized bed that entrainment of solid material is so extensive that if that material (or an equal amount of preheated material) is not recirculated back to the reactor the operation of the circulating fluidized bed is adversely affected.

It is suggested in U.S. Pat. No. 4,111,158 that the temperature and operation may be controlled by withdrawing solids from the circulation system, [consisting of a fluidized bed reactor, solids/gas separator and recycling conduit], cooling the withdrawn solids by fluidized bed heat exchanger, and then recycling cooled solids back to the fluidized bed reactor. The solids are withdrawn from near the bottom of the fluidized bed reactor via a conduit, and pass to an external remote fluidized bed cooler, and after cooling the solids part of them are turned to the fluidized bed reactor. Such an arrangement requires a separate system to have the solids transported between the fluidized bed cooler and the fluidized bed reactor. Moreover, its controlling capacity is poor, e.g. due to long conduits for transporting the solids, which long conduits also stiffer large heat losses. Such a system is also very complicated and expensive to manufacture and operate.

It has also been suggested to provide the solids cooled in a fluidized bed adjacent the main reactor, e.g. in an article in VORTEX™ FLUIDIZED BED TECHNOLOGY, ASME 1993, Fluidized Bed Combustion—Volume 1, pages 197–205. With such an arrangement it may be possible to diminish thermal losses and control delay of long connection conduits, but it still requires some device to return the solids to the main reactor, which in this case is a separate lift channel, which also requires additional power to operate. The solids are taken from the bottom of the reactor and the return of solids back to the reactor is realized by a separate lifting chamber, used to prevent the mixing of fluidization gas of the cooler and the conveying gas of the lifting chamber with each other. Also, control of such a system is difficult; there must always be an adequate volume of solids introduced into the lifting chamber or otherwise transportation is not successful.

In U.S. Pat. Nos. 4,893,426 and 4,823,740 there are disclosed different approaches to operation of a bubbling fluidized bed reactor. Bubbling fluidized bed reactors are operated at low velocities, so that a distinct upper surface of the bed is formed, contrary to circulating fluidized beds. In U.S. Pat. No. 3,893,426 there is shown a heat exchanger utilizing adjacent fluidized beds. Both beds have their fluidization gas distributing gird at the same horizontal level. In U.S. Pat. No. 4,823,740 there is shown a bubbling fluidized bed reactor wherein the lower part of the reactor is provided with thermal energy recovery chambers. These chambers are positioned substantially at same level with the bubbling bed in order to be capable of receiving solid material which enters above the top surface of the bubbling bed near the partition wall separating the bubbling bed and the recovery chamber. Solids are returned from the recovery chamber to the bubbling bed at a level above the fluidization grid of the bubbling bed.

U.S. Pat. No. 5,060,599 shows a circulating fluidized bed reactor having pockets formed in a sidewall of the reactor to receive material flowing downwardly along the wall. Each pocket is provided with an upward opening at a location where the density of the fluidized bed is considerably lower that adjacent the reactor bottom. Control of the material flow is accomplished by allowing the material to outflow over the edge of the pocket, or material is discharged via a duct or opening in the bottom of the pocket. The pocket is formed by providing a partition wall in the reaction chamber. To have sufficient volume for the pocket and heat transfers therein the partition wall must be relatively high up on the wall. This kind of heavy wall structure is very expensive and difficult to construct, it causes stresses to other structures at its connection locations, and causes undesired vibration of structures. If the height of the partition wall is increased the operation of the pocket will be restricted merely to high load operation, since at low loads not enough solid material will be falling into the pocket.

In U.S. Pat. No. 4,363,292 there is shown a system to provide heat transfer sections on the bottom grid of a fluidized bed reactor. In this system there are also partition walls provided above the grid to divide the bottom section of the reactor into several sections. This arrangement is also limited by its inability to provide a sufficient amount of heat transfer surface in the heat transfer section, particularly for low load conditions. In this and other known systems and methods for operating fluidized be reactors there are shortcomings which the present invention solves.

According to the present invention a system and method are provided that allow the temperature of the fluidized bed reactor to be controlled efficiently, allowing adequate heat transfer surface area for cooling of solid material. According to the invention it is possible to increase heat transfer capacity of the fluidized bed reactor at different loads and to provide effective and economical treatment of the solid material in the fluidized bed reactor. The heat transfer capacity of the reactor system cooler increases compared to the prior art, allowing effective operation at different loads. Yet these results are accomplished according to the present invention in a simple manner.

The most basic concept behind the present invention is the utilization of two different fluidized bed technologies, and the mounting of the two different beds in juxtaposition to each other so as to allow a mutual exchange of particles between the beds without requiring pumps, blowers, or other mechanical or pneumatic equipment to directly accomplish the exchange of particles.

The invention utilizes a circulating (fast) fluidized bed and a bubbling (slow) fluidized bed. The beds are mounted adjacent each other with first and second interconnections between them, typically with the fluidizing gas introducing grid of the bubbling bed below that of the circulating bed. Because the bubbling bed has substantially constant density throughout, with a clear demarcation line at the top thereof, the first interconnection is provided above the top of the bubbling bed so that the pressure and density conditions between the beds result in a flow of particles from the circulating bed to the bubbling bed through the first interconnection. However since the average density in the bubbling bed is higher than the density in the circulating bed, the pressure and density conditions cause the particles after treatment in the bubbling bed (e.g. after cooling) to return to the circulating bed through the second interconnection.

That is, it has been surprisingly found that it is possible to efficiently utilize different pressure conditions existing in a fluidized bed reactor system in order to transport material between two fluidized beds of solids. By appropriately arranging the chambers and openings through which they communicate with each other it is possible to maintain and control the operation of fluidized bed reactor so that efficient cooling of solid material is established in a safe and reliable manner at all operating loads. The present invention operatively connects a circulating fluidized bed and a slow fluidized bed to achieve these results.

In a circulating fluidized bed of solids, fluidization gas is introduced through a grid at the bottom of reactor chamber at such a rate that a considerable volume of solids is entrained with gas moving frown a lower section of the reaction chamber to an upper section thereof. Also, it is characteristic of circulating beds that the mean particle density gradually decreases toward the upper section of the reaction chamber beginning from an initial density of circulating fluidized bed at its bottom section, and there is not any distinct upper surface on the bed, rather the gas/solids suspension dilutes gradually upwardly. On the other hand, in a slow or bubbling fluidized bed there is a distinct upper surface below which the particle density is substantially constant and above which only insignificant amount of solids are present; i.e., the solid density is substantially zero above the upper surface. This is due to the relatively low rate of introduced fluidization gas.

According to the invention, the density of the slow fluidized bed is typically provided as greater than the initial density of circulating fluidized bed at its bottom section. These fluidized beds establish pressures which may be described by $\Delta p_1 = \rho_c g \Delta h$ or by pressure gradient $\Delta p_1/\Delta h$ for a circulating fluidized bed, and $\Delta p_2 = \rho_s g \Delta h$ or by pressure gradient $\Delta p_2/\Delta h$ for a slow or bubbling fluidized bed. In the slow fluidized bed the density will naturally dramatically drop at the height of the upper surface of the fluidized bed and thus the pressure $\Delta p_2$ will not increase above the upper surface of the slow fluidized bed—this height is designated as $h_o$. On the other hand, since the mean particle density in the circulating fluidized bed gradually decreases towards the upper section of the reaction chamber, there is no such dramatic change in a circulating fluidized bed. These lead to the fact that at a vertical location below the upper surface of the slow fluidized bed, at height $\Delta h_1$ being equal to or less than $h_o$, the pressure of the slow fluidized bed is greater than the pressure of the circulating fluidized bed, i.e. $\Delta p_2 > \Delta p_1$. And respectively, at a vertical location above the upper surface of the slow fluidized bed, at height $\Delta h_u$ which is greater than $h_o$, the pressure of the circulating fluidized bed is greater than the pressure of the slow fluidized bed, i.e. $\Delta p_1 > \Delta p_2$.

According to the invention it is possible to position a circulation mechanism or route for solids from the circulating fluidized bed via a slow fluidized bed with extended heat transfer surface area by utilizing the different pressure conditions of the circulating fluidized bed and slow or bubbling fluidized bed. By appropriately positioning the chambers and openings through which they communicate with each other it is possible to maintain and control the operation of fluidized bed reactor so that efficient cooling of solid material is established in a safe and reliable manner under all operating loads, but specifically also at low load conditions.

According to one aspect of the present invention a fluidized bed reactor system is provided which comprises the following elements: A fluidized bed reaction chamber comprising a circulating fluidized bed, having a first grid for the introduction of fluidizing gas into the circulating fluidized bed. A bubbling fluidized bed having a second grid for the introduction of fluidizing gas thereinto. The second grid mounted at a position vertically below the first grid. A first interconnection between the circulating fluidized bed and the bubbling bed providing for the passage of solids from the circulating bed to the bubbling bed, the first interconnection located above the first grid at a first position. And, a second interconnection between the circulating fluidized bed and the bubbling bed providing for the passage of solids from the bubbling bed to the fluidized bed, the second interconnection located below the first interconnection, but at the level of, or above, the first grid. The circulating and bubbling beds, and interconnections therebetween, being positioned with respect to each other so that the pressure and density conditions within the beds establish the driving force to control the flow of particles frown the circulating bed to the bubbling bed through the first interconnection, and from the bubbling bed to the circulating bed through the second interconnection [there may be other, preferably non-mechanical, flow-controlling means].

Typically a cooling means, such as an indirect heat exchanger, is provided in the bubbling bed for cooling the solids therein. Also a partition divides the bubbling bed into first and second chambers, the first chamber in direct communication with the first interconnection, and the second chamber in direct communication with the second interconnection. The partition prevents short circuiting of particles between the first and second interconnections, so that all particles passing into the bubbling bed will be cooled.

The cooling mechanism may be located only in the first chamber, only in the second chamber, or in both the first and second chambers. The first and second chambers can be of any relative size, but it is preferred that the first chamber have a first cross-sectional area and that the second chamber have a second cross-sectional area which is less than 50% (preferably less than 25%) of the first cross-sectional area. Preferably the heat transfer means in the bubbling bed extend at least partly below the first grid.

Typically the reaction chamber has a first sidewall which is disposed at an angle greater than about 10 degrees with respect to the vertical, and a first interconnection comprises a first opening in the sidewall and the second interconnection comprises a second opening in the sidewall between the first interconnection and the first grid. A valved solid withdrawal conduit may be provided adjacent the second grid for selectively withdrawing solids from the bubbling bed. Also a portion of the second grid may be provided beneath, and horizontally overlapping, the first grid so that the second interconnection is disposed in an interruption in the first grid. The partition may extend only vertically within the bubbling bed, only at an angle of greater than about 20 degrees to the vertical, or first at angle and then essentially vertically.

According to another aspect of the present invention a method of operating a fluidized bed reactor system comprising a reaction chamber including a first fluidized bed and an accessory chamber comprising a second fluidized bed is provided. The method comprises the steps off (a) Operating the first fluidized bed as a fast, circulating, fluidized bed. (b) Operating the second fluidized bed as a slow, bubbling, fluidized bed. (c) Causing a first stream of particles to flow from a first interconnection location within the first bed into the second bed essentially solely because of pressure and density differences between the beds at the first interconnection location. And, (d) causing a second stream of particles to flow from a second interconnection location within the first bed from the second bed into the first bed essentially solely because of pressure and density differences between the beds at the second interconnection location.

There preferably is also the further step of cooling the particles in the bubbling bed between steps (c) and (d), as by directing them (e.g. with partitions) to flow past an indirect heat exchanger or a like cooling mechanism. Step (c) is typically practiced in a first vertical position within the circulating bed and step (d) is practiced in a second vertical position within the circulating bed lower than the first position, and the mean density in the bubbling bed is greater than the density in the circulating bed at the second interconnection.

Typically—as described above with respect to the apparatus—the reaction chamber includes a grid for introducing fluidized air into the circulating fluidized bed, and step (d) can be practiced to introduce solids from the bubbling bed into the circulating bed at a horizontal intermediate portion of the grid from below the grid.

According to a preferred embodiment of the present invention the driving force created by the difference between the second and first vertical pressure gradients and/or the solid density distributions may be advantageously utilized for transporting solids from the second fluidized bed to the first at the second interconnection by providing the second vertical pressure gradient to be greater than the first pressure gradient at the level of the second interconnection. Also, transferring heat from the solids indirectly into heat transfer medium, preferably steam or water, may be practiced in the second fluidized bed safely and efficiently. The second fluidized bed may be fluidized by using a gas (e.g. nitrogen) that establishes conditions that are favorable for safe long term operation, for example hazardous conditions caused by chlorine may be avoided. The driving force created by the difference between the first and second vertical pressure gradient and/or the solid density distribution may be advantageously utilized for transporting solids from the first fluidized bed to the second at the first interconnection by providing the first vertical pressure gradient to be greater than the second pressure gradient at the first interconnection. Thus the solids are flowing from first fluidized bed chamber to second fluidized bed chamber.

Advantageously, it is possible to extend the second fluidized bed of solids below the grid of the first fluidized bed and provide an extended heat transfer surface in the second fluidized bed of solids at a portion thereof below the first grid for transferring heat from the solids into a heat transfer medium, by establishing the movement or transportation of the solids by utilizing substantially only the driving force created by the different pressure conditions in the fluidized beds. In this manner it is possible to provide as much heat transfer area (and volume of the second fluidized bed) as required for adequate operation of the process while still making possible the introduction of solid material from the first fluidized bed, even at low load conditions when the fluidization is at reduced mode and only a small amount of solids are entrained by gas to move to a higher level. The present invention makes it possible to position the first interconnection at a vertical location where an adequate rate of solid flow may be realized even at low load conditions. And further, there is no need to provide any partition walls inside the first fluidized bed reactor when practicing the invention.

It is the primary object of the present invention to provide a simple yet efficient fluidized bed reactor system capable of efficient operation under a wide variety of circumstances. This and other objects of the invention will become clear from an inspection of the detailed description of the invention and from the appended claims.

DETAILED DESCRIPTION OF THE DRAWINGS

Figure 1:
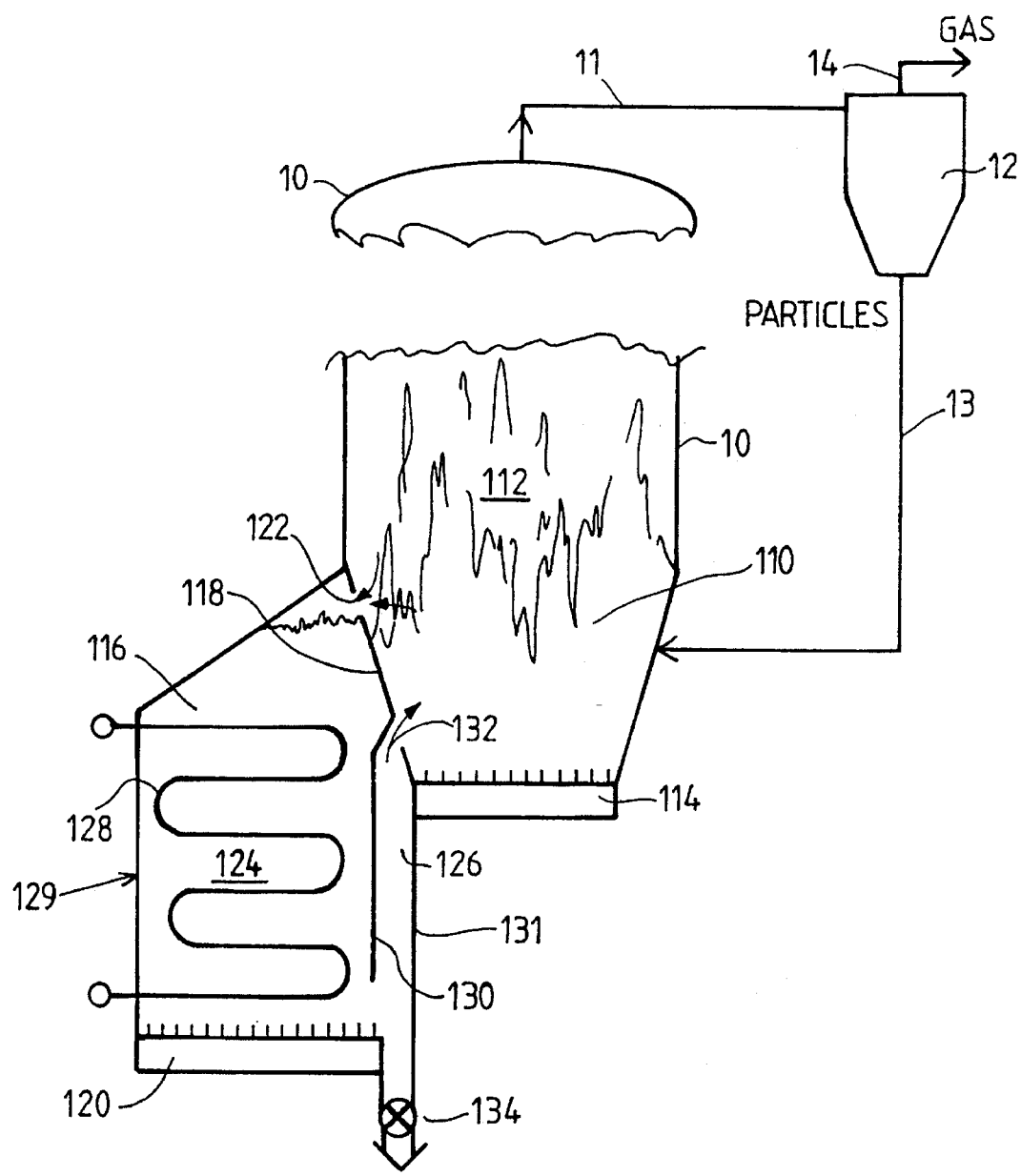
FIG. 1 is a side schematic view, with portions of the circulating fluidized bed reactor vessel cut away for clarity of illustration, of a first exemplary embodiment of the system according to the present invention.

FIG. 1 shows primarily the lower part of a circulating fluidized bed reactor, in a vessel 10, according to a preferred embodiment of the present invention. The details of the upper portion are of no significance to the present invention and may be constructed according to teachings of the prior art. The upper portion will include, however, a gas discharge 11 adjacent the top of the vessel 10, a particle (e.g. cyclone) separator 12, and a return duct 13 for returning particles separated by separator 12 to the lower portion of vessel 10. Product or exhaust gas (e.g. from gasification or combustion) exits separator 12 in line 14.

According to the present invention there is provided a first fluidized bed of solids 110 in a reaction chamber 112 within vessel 10, having a grid 114 for introducing fluidizing gas into the first fluidized bed of solids 110. The first fluidized bed 110 is operated so that it is a circulating fluidized bed, i.e. operation is effected so that a considerable volume of solid particles are entrained in gas moving upwardly in the reactor chamber 112, and returned via line 13.

In the FIG. 1 embodiment the first fluidized bed of solids 110 is divided by a sidewall 118 from a second fluidized bed of solids 116 having a second grid 120 for introducing fluidizing gas. The second fluidized bed of solids 116 is operated as a bubbling fluidized bed, and receives solids from the first fluidized bed via an opening 122 in the wall 118. The sidewall 18 is shown as a wall of the vessel 10 and makes an angle of greater than about 10 degrees to the vertical.

The first, i.e. the fast or circulating, fluidized bed 110 is operated so as to provide a predetermined first vertical pressure gradient distribution ($\Delta p_1/\Delta h$) in the bed of fluidized solids 110. And, the second, i.e. slow or bubbling, fluidized bed 116 is operated so as to provide a predetermined second vertical pressure gradient distribution ($\Delta p_2/\Delta h$). The opening or openings 122 (illustrated herein as only one opening only for clarity of illustration) is according to the invention positioned at such a level that the solids from the first fluidized bed 110 are transported to the second fluidized bed 116 essentially solely by the driving force created by a larger pressure gradient ($\Delta p_1/\Delta h$) in the circulating fluidized bed 110 at the level of the opening 122 than for the bed 116 at that location.

In the second fluidized bed 116 there are provided at least two chambers (124, 126) comprising an inlet chamber 124 for transporting the solids downwardly in the second fluidized bed 116 of solids into its lower section, and an outlet chamber 126 for transporting the solids upwardly to a level above the first grid 114. The opening 122 is provided in the upper section of the inlet chamber 124 connecting the inlet chamber 124 with the circulating fluidized bed 110. In this embodiment heat transfer surfaces 128 are disposed only in inlet chamber 124, and the cross-sectional are of the inlet chamber 124 is much larger than the cross-sectional area of the outlet chamber 126. Preferably the cross-sectional area of the flow area in the outlet chamber 126 is <50% of the cross-sectional area of the flow area in the inlet chamber 124. Desirably the cross-sectional flow area of the outlet chamber 126 is <30%, or <25%, of the total cross-sectional flow area of the second fluidized bed 116.

In the second fluidized bed 116 a partition wall 130 may be provided for enhancing the downward movement of the solids in the inlet chamber 124 of the second fluidized bed 116 and the upward movement in the outlet chamber 126. This partition wall 130 must at least provide desired movement of the solids in the second fluidized bed 116, so that a desired heat transfer rate is achieved and no significant volume of solids is conveyed (i.e. short-circuits) directly from opening 122 to outlet opening 132 in the common wall 118 at the outlet chamber 126. Where the proper functioning of the second fluidized bed 116 is achieved by controlling the fluidization rate and volume through the grid 120, the partition wall 130 may be considerably shorter i.e. not extending as close to the grid 120 as shown in FIG. 1. The wall 130 is essentially completely vertical, having only a small bent or crowed section at its connection to wall 118.

According to the invention it is possible to have the solids circulate via a route including the circulating fluidized bed 110—the inlet chamber 124 of the bubbling fluidized bed 116—the outlet chamber 126 of the bubbling fluidized bed—and back into the circulating fluidized bed 110, in a manner that makes it possible to effectively utilize the entire area of the heat transfer surface 128 in the second fluidized bed, eliminating the need for a separate conveyor to facilitate the movement of solids. Also, it is possible to have simultaneously enough heat transfer surface in the second fluidized bed 116, enough material entering from the circulating fluidized bed 110 even under low load conditions due to the substantially low vertical position of opening 122 in the common wall 118, to achieve a simple and cost-effective circulation of solid material.

The heat transfer surface 128 comprises a cooling means through which cooling fluid (e.g. steam or water) circulates to cool the particles in bed 116. Any other conventional cooler may also or alternatively be utilized, and any fluid flow operatively connected to a turbine, process steam generator, or the like, to use the heat energy recovered from solids in slow bed 116.

Figure 2:
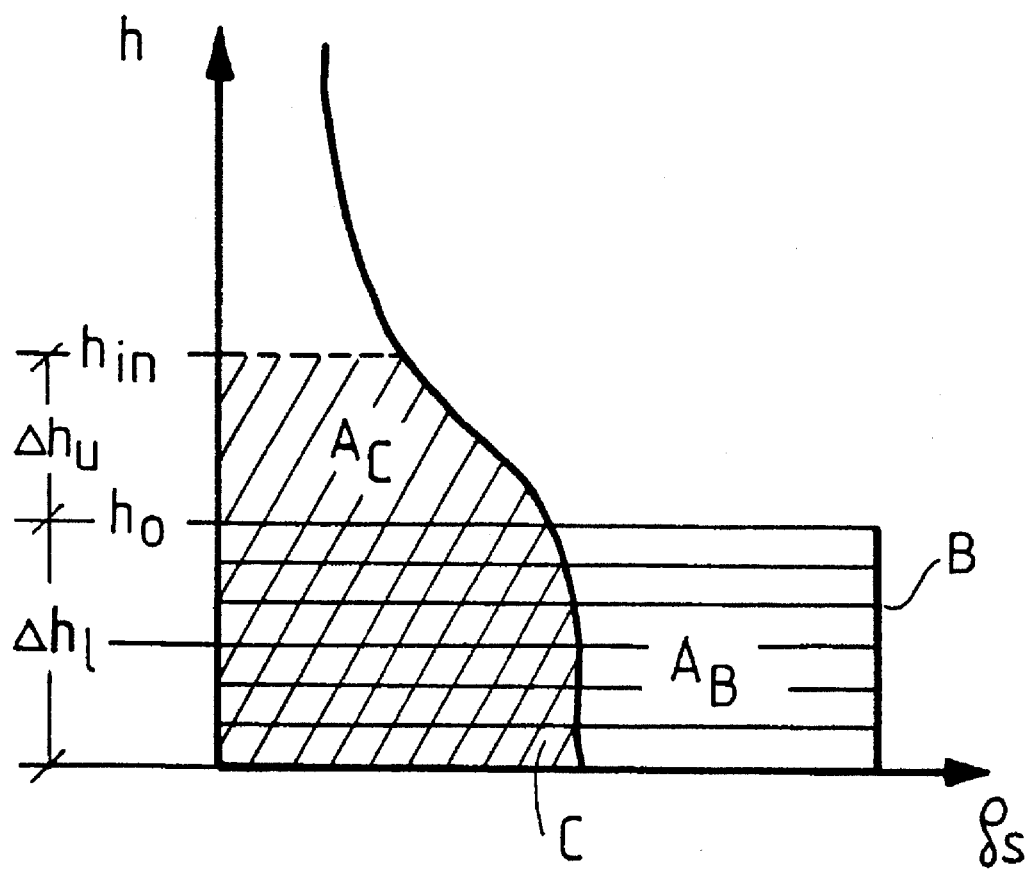
FIG. 2 is a diagram showing an exemplary particle density distribution in the fluidized beds of the system of FIG. 1.

The first fluidized bed 110 and the second fluidized bed 116 are operated so that vertical solid material density distributions in the beds results in the movement of the solids. This distribution is schematically illustrated in FIG. 2. Reference B illustrates the density distribution of the second fluidized bed 116, and C illustrates the density distribution of the first bed 110. Above a certain level $h_o$ the density of the first fluidized bed 110 is greater than the density in the second fluidized bed 116 at height $\Delta h_u$, which results in a pressure difference $\Delta p_1 = \rho_c$ g $\Delta h$. In the circulating fluidized bed 110 of solids (curve C) fluidization gas is introduced through grid 114 at the bottom of reactor chamber 112 at such a rate that a considerable volume of solids is entrained in gas flowing from the lower section of the reaction chamber 112 to the upper section thereof. Also, the mean particle density in the circulating fluidized bed 110 gradually decreases towards the upper section of the reaction chamber 112 beginning from an initial density of circulating fluidized bed 110 at its bottom section, as shown by curve C in FIG. 2. Also, as clear from FIG. 2, there is no distinct upper surface of the bed 110, but the gas/solids suspension dilutes gradually upwardly.

FIG. 2 also shows on the other hand, that in a slow or bubbling fluidized bed 116 there is a distinct upper surface below which the particle density is substantially constant, height $\Delta h_1$, and above which only insignificant amounts of solids are present; i.e. the solid density is substantially zero above the upper surface, as shown by curve B in FIG. 2. The density of the slow fluidized bed 116 is controlled so as to be greater than the initial density of circulating fluidized bed at its bottom section at height $\Delta h_1$ (i.e. at grid 114). These fluidized beds establish pressures which may be described by $\Delta p_1 = \rho_c$ g $\Delta h$ or by the pressure gradient $\Delta p_1/\Delta h$ for the circulating fluidized bed 110, and $\Delta p_2 = \rho_B$ g $\Delta h$ or by the pressure gradient $\Delta p_2/\Delta h$ for the slow or bubbling fluidized bed 116. In the slow fluidized bed 116 the density will naturally dramatically drop at the height of the upper surface of the fluidized bed 116 and thus the pressure $\Delta p_2$ will not increase above the upper surface of the slow fluidized bed. [This height is $h_o$.] On the other hand, since the mean particle density in the circulating fluidized bed 110 gradually decreases towards the upper section of the reaction chamber 112, there is no dramatic change in the circulating fluidized bed 110. These lead to the fact that at vertical locations equal to or below the upper surface of the slow fluidized bed 116, at height $\Delta h$ being equal to or less than $h_o$, the pressure of the slow fluidized bed 116 is greater than the pressure of the circulating fluidized bed 110, i.e. $\Delta p_2 > \Delta p_1$. And respectively, at vertical locations above the upper surface of the slow fluidized bed 116, at height $\Delta h_u$ being greater than $h_o$, the pressure of the circulating fluidized bed 110 is greater than the pressure of the slow fluidized bed 116, i.e. $\Delta p_1 > \Delta p_2$. This provides for the desired movement of solids according to the present invention.

Figure 5:
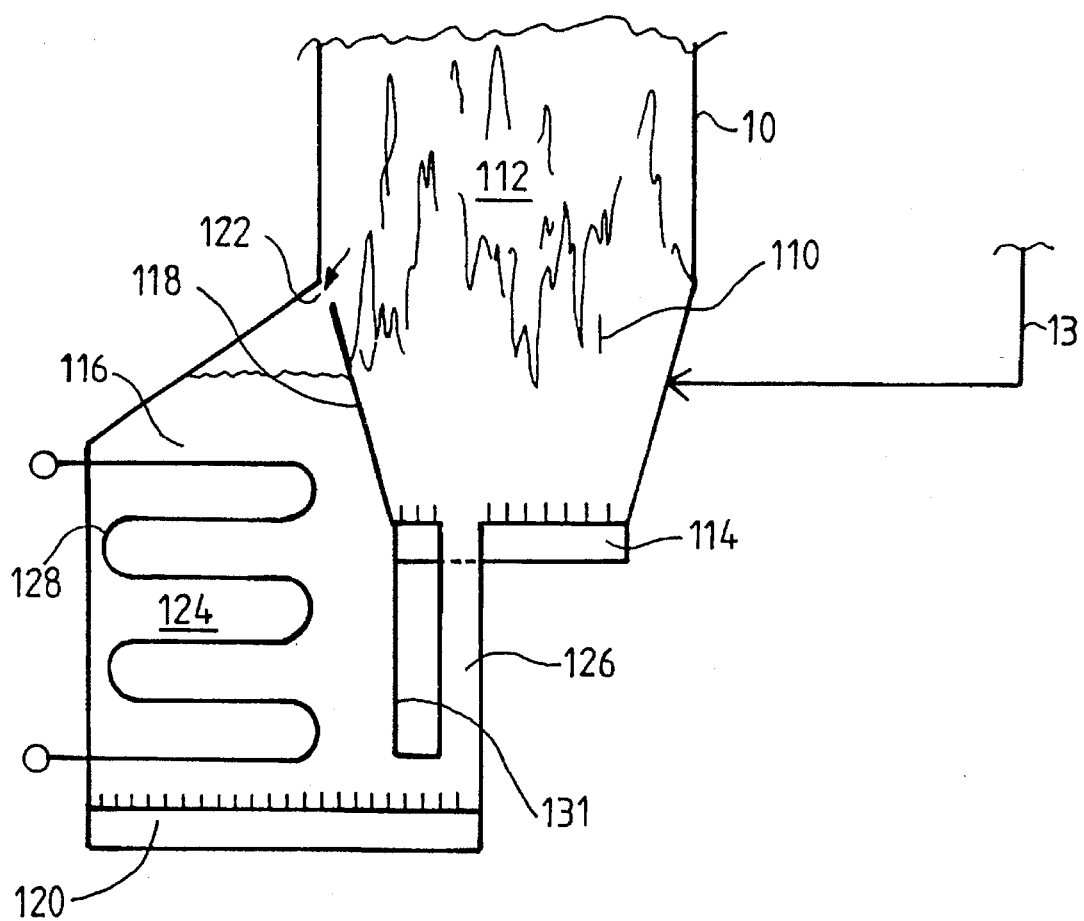

In FIG. 1 the opening 122 in the common wall 118 is disposed so that the lower edge of the opening 122 is at the position $h_o$. This effects the movement of solids from the first fluidized bed 110 of solids to the second fluidized bed 116 at an area above the position $h_o$, wherein the solids fall into the bed 116 at a level below the position $h_o$. And, as can be seen from FIG. 2, below that position the solids density of the second bed 116 is much greater than in the first fluidized bed, so that at this position the pressure will be $\Delta p_a = \rho_s$ g $\Delta h$. However, the opening 122 may also be positioned so that the lower edge of the opening 122 is at position $h_{in}$, above the height $h_o$, e.g. as shown in FIG. 5. In that case the driving force for introducing solids from the first fluidized bed is established between the level $h_o$ and the level $h_{in}$. The total driving force, in such a case when $h_{in}$ is a higher level than $h_o$, is created by the solid density in the second fluidized bed 116, curve B, should be reduced for height $h_{in}$ by determining a mean pressure gradient for that height. Basically the driving force is adequate if the area $A_B$ is greater than area $A_C$.

As illustrated in FIG. 1, the second fluidized bed 116 extends to a lower vertical level than the level of the first grid 114 of the first fluidized bed 110. It has been surprisingly found that it is possible to provide the required volume of solids for the second fluidized bed 116, and thus provide the required amount of heat transfer surface therein, by extending the second fluidized bed 116 to a lower vertical level than the level of the first grid 114 of the first fluidized bed 110. That way the opening 122 may be positioned at a level which ensures functionality even under low load conditions; that is at such a location that there is a considerable flow of solids even under low load conditions when the upward entrainment of the solids is weak. And, by controlling conditions resulting in a desired pressure different ($\Delta p_2$–$\Delta p_1$) it is possible to provide for movement of the solids via the route circulating fluidized bed 110—inlet section 124 of the bubbling fluidized bed 116—outlet section 126 of the bubbling fluidized bed—and circulating fluidized bed 110. This pressure difference may be utilized for transferring the solids through the route in the downwardly extended second fluidized bed 116.

The outlet section 126, free of heat transfer surface in the FIG. 1 embodiment, may be constructed as a narrow slot between the partition 130 and a wall 131 of the vessel 129 defining the second fluidized bed of solids 116. The slot 126 may have equal width with the wall 131, or it may only cover a portion of the wall 131, and preferably the partition 130 has a width equal to that of the outlet section 126. It is also possible to arrange the outlet section 126 in the form of tube or a like structure inside the chamber 116, one end connected to the first fluidized bed 110 and the other end being in communication with the lower section of the second fluidized bed 116.

In operation of the fluidized bed reactor there may also be a need to remove coarser particles from the system. This is preferably accomplished by providing the second fluidized bed 116 with a valved, controllable, outlet 134. Thus the heat of the solids to be removed may be extracted by heat transfer surfaces 128 before discharging them from the process.

Figure 3:
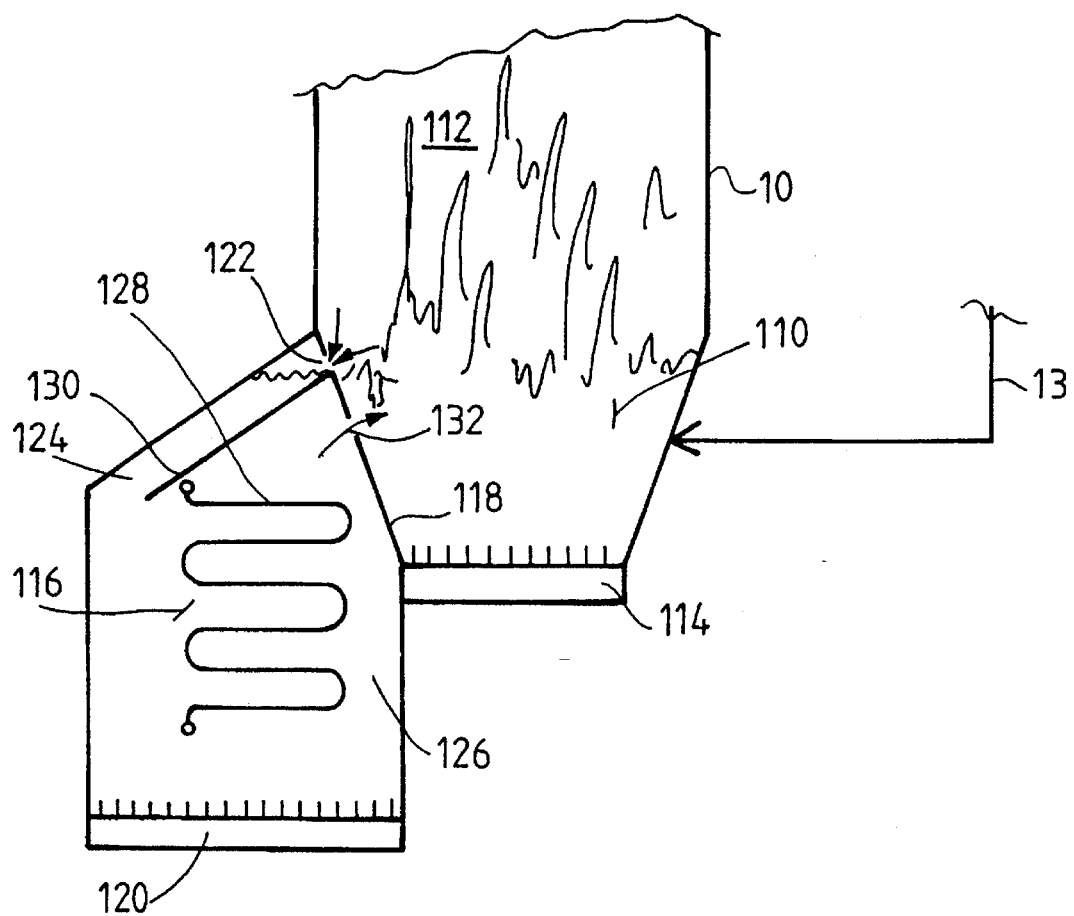
FIGS. 3 through 5 are views like those of FIG. 1 only showing different exemplary embodiments of the system according to the present invention.

In FIG. 3 there is disclosed another embodiment of the present invention. This is otherwise similar to one shown in FIG. 1 but the second fluidized bed of solids 116 is constructed differently. In this embodiment the inlet section 124 is formed to have a narrower flow cross-sectional area than the outlet section 126. Hence the heat transfer surfaces 128 are provided in the outlet section 126. There is a partition wall 130 dividing the bed 116 into the inlet and outlet sections 124, 126. In this embodiment the partition wall 130 is high above the grid 120, and preferably is at an angle of greater than 20 degrees to the vertical. Partition 130 directs the flow of the solids to achieve the desired cooling of the solids in the outlet section 126.

Figure 4:
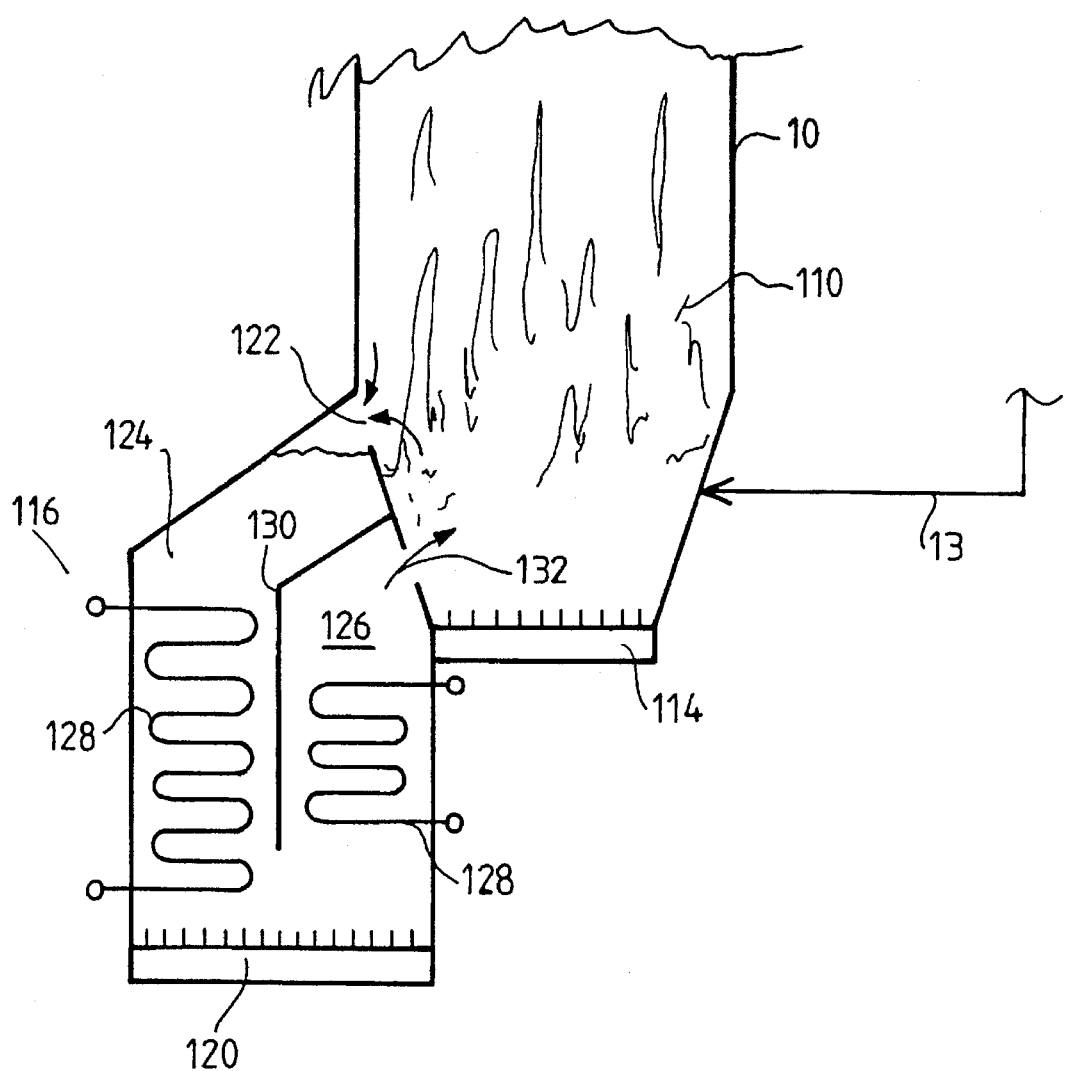

In FIG. 4 there is disclosed still another embodiment of the present invention. This is otherwise similar to those in the FIGS. 1 and 3, except that the second fluidized bed of solids 116 is constructed differently. In this embodiment the inlet section 124 and outlet section 126 are formed to have substantially equal flow cross-sectional areas. Hence heat transfer surfaces 128 are provided in both of the sections 124, 126. Partition wall 130, which extends at an angle to the vertical greater than 20 degrees, and then essentially completely vertically, divides the bed 116 into inlet and outlet sections 124, 126. In this embodiment the partition wall 130 extends to a level below the heat transfers 128 in a manner providing positive flow of the solids in order to achieve the desired cooling of solids in both chambers 124 and 126.

In FIG. 5 there is disclosed still another embodiment of the present invention. This is otherwise similar to one shown in FIG. 1 but the second fluidized bed of solids 116, and grid 114, are formed differently. In this embodiment the inlet section 124 encompasses substantially the whole volume of the bed 116, and the outlet section 126 is formed outside the chamber wall 131. In this embodiment the heat transfer surfaces 128 are provided in the inlet section chamber 124. There is a duct 126 connecting the second fluidized bed 116 and the first fluidized bed 110, discharging into the bed 116 at approximately the level of the grid 114.

While various embodiments of the invention and suggested modification thereto have bene described, it should be understood that other modifications could be made in the structure and arrangement of the described embodiments without departing from the scope of the invention which is more defined in the following claims. For example the invention may be applied to different reactions or uses of fluidized bed reactor. Also the invention is applicable to both atmospheric and superatmospheric (i.e. pressurized—such as shown in U.S. Pat. No. 4,869,207) systems. The compact nature of the system of the invention has an enormous space-saving advantage, and lesser equipment requirements than the prior art.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A fluidized bed reactor system comprising:

a fluidized bed reaction chamber comprising a circulating fluidized bed, having a first grid for the introduction of fluidizing gas into said circulating fluidized bed;

a bubbling fluidized bed having a second grid for the introduction of fluidizing gas thereinto;

said second grid mounted at a position vertically below said first grid;

a first interconnection between said circulating fluidized bed and said bubbling bed providing for the passage of solids from said circulating bed to said bubbling bed, said first interconnection located above said first grid at a first position; and a second interconnection between said circulating fluidized bed and said bubbling bed providing for the passage of solids from said bubbling bed to said fluidized bed, said second interconnection located below said first interconnection, but at the level of, or above, said first grid;

solids cooling means located in said bubbling bed for cooling the solids therein; and a partition dividing said bubbling bed into first and second chambers, said first chamber in direct communication with said first interconnection, and said second chamber in direct communication with said second interconnection, said partition preventing short-circuiting of particles between said first and second interconnections.

2. A system as recited in claim 1 wherein said first chamber has a first cross-sectional area, and said second chamber has a second cross-sectional area which is less than 50% of said first cross-sectional area.

3. A system as recited in claim 2 wherein said cooling means is located only in said first chamber.

4. A system as recited in claim 2 wherein a portion of said second grid is beneath, horizontally overlapping, said first grid, said second cross-sectional area being less than 25% of said first cross-sectional area, and said second interconnection disposed in an interruption in said first grid.

5. A system as recited in claim 1 wherein said cooling means is located in both said first and second chambers.

6. A system as recited in claim 1 wherein said cooling means is located only in said second chamber.

7. A system as recited in claim 1 wherein said reaction chamber has a first sidewall; and wherein said first interconnection comprises a first opening in said first sidewall, and wherein said second interconnection comprises a second opening in said first sidewall.

8. A system as recited in claim 7 wherein said first sidewall is disposed at a angle of greater than about 10 degrees with respect to the vertical, and wherein said second interconnection is horizontally positioned between said first interconnection and said first grid.

9. A system as recited in claim 7 further comprising a partition dividing said bubbling bed into first and second chambers, said first chamber in direction communication with said first interconnection, and said second chamber in direction communication with said second interconnection, said partition preventing short-circuiting of particles between said first and second interconnections.

10. A system as recited in claim 1 further comprising a valved solids withdrawal conduit adjacent said second grid for selectively withdrawing solids from said bubbling bed after cooling by said solids cooling means.

11. A system as recited in claim 1 wherein said cooling means comprises a heat exchanger.

12. A system as recited in claim 1 wherein said partition extends essentially only vertically within said bubbling bed.

13. A system as recited in claim 9 wherein said partition extends from said first sidewall essentially only at an angle of greater than about 20 degrees to the vertical within said bubbling bed.

14. A system as recited in claim 9 wherein said partition extends from said first sidewall first at an angle of greater than about 20 degrees to the vertical, and then essentially completely vertical, within said bubbling bed.

15. A system as recited in claim 9 wherein said partition extends from said first sidewall from a position immediately above said second opening, and extends essentially completely vertically within said bubbling bed.

16. A system as recited in claim 1 wherein said cooling means is at least partly located below the level of said first grid.

17. A method of operating a fluidized bed reactor system comprising a reaction chamber including a first fluidized bed and an accessory chamber comprising a second fluidized bed, comprising the steps of:

(a) operating the first fluidized bed as a fast, circulating, fluidized bed;

(b) operating the second fluidized bed as a slow, bubbling, fluidized bed;

(c) causing a first stream of particles to flow from a first interconnection location within the first bed into the second bed essentially solely because of pressure and density differences between the beds at the first interconnection location; and (d) causing a second stream of particles to flow from a second interconnection location within the first bed from the second bed into the first bed essentially solely because of pressure and density differences between the beds at the second interconnection location.

18. A method as recited in claim 17 comprising the further step of cooling the particles in the bubbling bed between steps (c) and (d).

19. A method as recited in claim 18 wherein step (c) is practiced at a first vertical position within the circulating bed, and wherein step (d) is practiced at a second vertical position within the circulating bed, lower than the first position; and wherein all of steps (a)–(d) are practiced so that the mean density in the bubbling bed is greater than the circulating bed density at the second interconnection.

20. A method as recited in claim 19 comprising the further step (e) of positively directing the flow of particles from the first interconnection through the bubbling bed to the second interconnection so that essentially all the particles are cooled while in the bubbling bed.

21. A method as recited in claim 20 wherein step (e) is practiced by providing one or more partitions in the bubbling bed.

22. A method as recited in claim 18 wherein the reaction chamber includes a grid for introducing fluidizing air into the circulating fluidized bed; and wherein step (d) is practiced to introduce solids from the bubbling bed into the circulating bed at a horizontally intermediate portion of the grid.

23. A method as recited in claim 17 wherein the reaction chamber includes a grid for introducing fluidizing air into the circulating fluidized bed; and wherein step (d) is practiced to introduce solids bubbling bed into the circulating bed at a horizontally intermediate portion of the grid.

24. A method as recited in claim 17 wherein step (c) is practiced at a first vertical position within the circulating bed, and wherein step (d) is practiced at a second vertical position within the circulating bed, lower than the first position.

* * * * *